United States Patent [19]

Miyasaka

[11] Patent Number: 4,972,399
[45] Date of Patent: Nov. 20, 1990

[54] APPARATUS AND METHOD FOR ACCESSING A DISK CHARACTERISTIC DATA RECORDING AREA OF AN OPTICAL DISK

[75] Inventor: Toshiyuki Miyasaka, Yokohama, Japan

[73] Assignee: Kabushiki Kaisha Toshiba, Kawasaki, Japan

[21] Appl. No.: 241,733

[22] Filed: Sep. 8, 1988

[30] Foreign Application Priority Data

Sep. 9, 1987 [JP] Japan ................................. 62-225528

[51] Int. Cl.$^5$ ............................................. G11B 7/00
[52] U.S. Cl. .................................... 369/44.27; 369/58
[58] Field of Search ............................ 369/53–58, 369/43, 44.11, 44.26, 44.27; 360/31, 25

[56] References Cited

U.S. PATENT DOCUMENTS

| | | | |
|---|---|---|---|
| 4,498,146 | 2/1985 | Martinez | 360/31 X |
| 4,769,802 | 9/1988 | Tatsuguchi | 369/46 |
| 4,835,757 | 5/1989 | Abiko | 369/58 X |

FOREIGN PATENT DOCUMENTS

| | | |
|---|---|---|
| 0164061 | 11/1985 | European Pat. Off. . |
| 0164131 | 11/1985 | European Pat. Off. . |
| 2718092 | 11/1977 | Fed. Rep. of Germany . |

*Primary Examiner*—Robert L. Richardson
*Attorney, Agent, or Firm*—Finnegan, Henderson, Farabow, Garrett, and Dunner

[57] ABSTRACT

An optical apparatus is disclosed for reproducing data by focusing a light beam onto an optical disk. The optical disk has a first area, a second area having a characteristic data of the disk and a third area having data to be reproduced. Each area is located on the disk along the radial direction from the inner portion of the disk to the outer portion of the disk. The optical apparatus includes an optical unit for directing the light beam onto the optical disk, the optical unit facing the first area at an initial condition and a driving unit for moving the optical unit in the radial direction from the inner portion to the outer portion. The optical apparatus further includes a detector for detecting the existence of the second area of the disk while the optical unit is moved by the driving unit.

19 Claims, 6 Drawing Sheets

FIG. 6A  VIDEO SIGNAL

FIG. 6B  ENVELOPE SIGNAL

FIG. 6C  BINARY-CODED ENVELOPE SIGNAL

APPARATUS AND METHOD FOR ACCESSING A DISK CHARACTERISTIC DATA RECORDING AREA OF AN OPTICAL DISK

BACKGROUND OF THE INVENTION

1. Field of the Invention

The present invention relates to a data recording/reproducing apparatus, and, more particularly, to an apparatus for accessing a control track on an optical disk and a method for the same.

2. Description of the Related Art

Data recording/reproducing apparatuses use different recording mediums depending on the types of data they deal with. For instance, optical data recording/reproducing apparatuses generally use an optical disk. An optical disk has a plurality of tracks formed on its surface in a spiral. Each track has a groove for performing tracking-servo control. Information is recorded by irradiating a laser beam on a record film. There are further a number of sectors set on the surface of the optical disk in its radial direction, each sector having its own address.

The types and characteristics of such optical disks, such as surface reflection factors of optical disks, laser power required for data readout or data writing and the number of sectors around the disk, vary depending on the makers, so that there is conventionally no disk compatibility between them. Under this environment, ISO has set the standard regulations for optical disks, which are intended for the following. A control track, common to the individual makers, is provided inside a recording area of a disk where record data is to be recorded, and data about the characteristic and type of the disk is recorded on this track, whereby any user can effect control of the disk according to that data. Although writing of the types and characteristics of disks on the control track has been considered, no consideration has been given as to how to access the written data for data readout.

With the prior art technique, therefore, the data written on the control track cannot be actually read out to show the type and characteristic of the disk, nor can disk control according to the data be carried out.

SUMMARY OF THE INVENTION

Accordingly, it is an object of this invention to provide an apparatus which ensures access to, and readout of, disk characteristic data of an optical disk that is recorded on a control track of the disk.

It is another object to provide a method of ensuring access to, and readout of, disk characteristic data of an optical disk that is recorded on a control track of the disk.

To achieve the first object, there is provided an optical apparatus for reproducing data by focusing a light beam onto an optical disk, the optical disk having a first area, a second area having a characteristic data of the disk and a third are having data to be reproduced, each area located on the disk along the radial direction from the inner portion of the disk to the outer portion of the disk, the optical apparatus comprising, means for directing the light beam onto the optical disk, the directing means facing the first area at an initial condition, means for moving the directing means in the radial direction from the inner portion to the outer portion; and means for detecting the existence of the second area of the disk while the directing means is moved by the moving means.

To achieve the second object, there is provided a method of reproducing data by focusing a light beam onto an optical disk, the optical disk having a first area, a second area having a characteristic data of the disk and a third area having data to be reproduced, each area located on the disk along the radial direction from the inner portion of the disk to the outer portion of the disk, the method comprising the steps of directing the light beam onto the optical disk by an optical unit, the optical unit facing the first area at an initial condition, moving the optical unit in the radial direction from the inner portion to the outer portion by a driving unit, and detecting the existence of the second area of the disk by a detector while the optical unit is moved by the driving unit.

BRIEF DESCRIPTION OF THE DRAWINGS

The foregoing aspects and other features of the invention will be explained in the following description taken in conjunction with the accompanying drawings wherein.

DETAILED DESCRIPTION OF THE PREFERRED EMBODIMENT

An embodiment of this invention will be described below with reference to the accompanying drawings.

Figure 2:
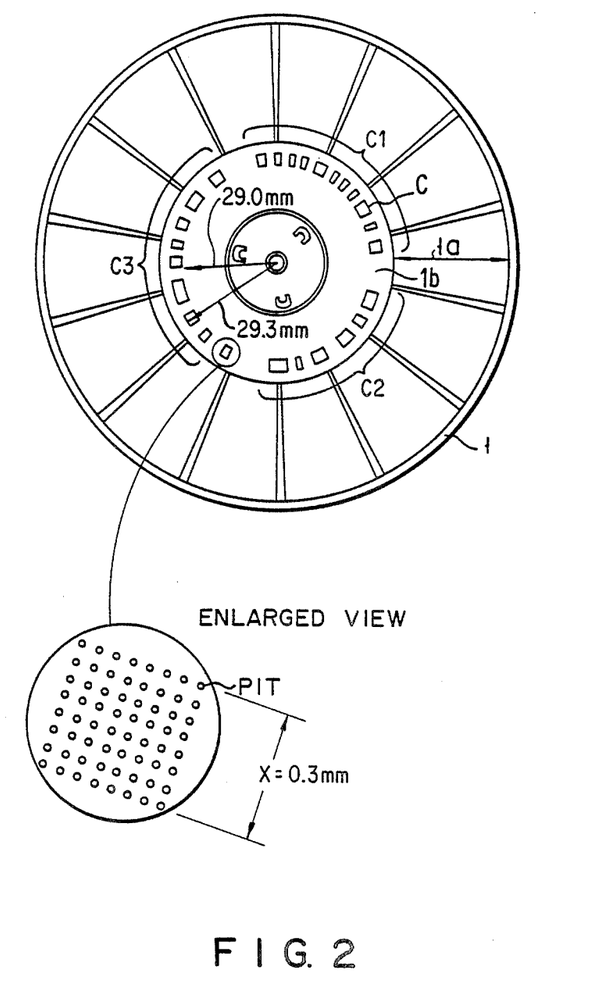
FIG. 2 is a diagram illustrating the structure of an optical disk having a control track provided at its inner circumference.

FIG. 2 illustrates the structure of an optical disk 1 having a control track C formed at its inner circumference.

Optical disk 1 comprises a glass or plastic, disk-shaped substrate and an optical data recording metal coating layer, which is coated on the substrate and is composed of tellurium or bismuth. A data recording area 1a of optical disk 1 has 256 sectors in its radial direction, which are given sector addresses from 0 to 255. The data recording area 1a further has a plurality of tracks provided in a spiral, each track having recording holes, called pits, carrying optical data. The distance between pits is associated with data to be recorded. The number of the tracks that data recording area 1a can hold is 36,000. Each track is divided into blocks amounting to 300,000. Each block has a block header provided at its head portion, which includes data such as the block number and track number. This block header may be provided at the time of manufacturing each optical disk.

Optical disk 1 further has a disk characteristic data recording area 1b provided inward of data recording area 1a and provided with a control track C. This control track C may be provided at the time of manufacturing the optical disk. Data about the characteristic and type of the optical disk are recorded in bar code on control track C at three sections C1, C2 and C3 therearound in the circumferential direction thereof. According to the ISO standard, these three sections C1, C2 and C3 hold the same disk characteristic data which includes data about the characteristic of optical disk 1, such as the reflection factor of the coating layer, data about the power of a semiconductor laser required for irradiating a laser beam on the coating layer at the time of data recording/reproducing, and data about the format, such as the number of sectors on, and around, the surface of the optical disk in the circumferential direction.

As shown in Enlarged View of FIG. 2, control track C has a predetermined recording width X in the radial direction of optical disk 1, the width defined in reference to the distance (radial position) from the center 0 of optical disk 1. For instance, control track C in FIG. 2 is recorded on a region lying between the distances of 29.0 mm and 29.3 mm from the center 0 of disk 1; therefore, the recording width is 0.3 mm.

Figure 4:
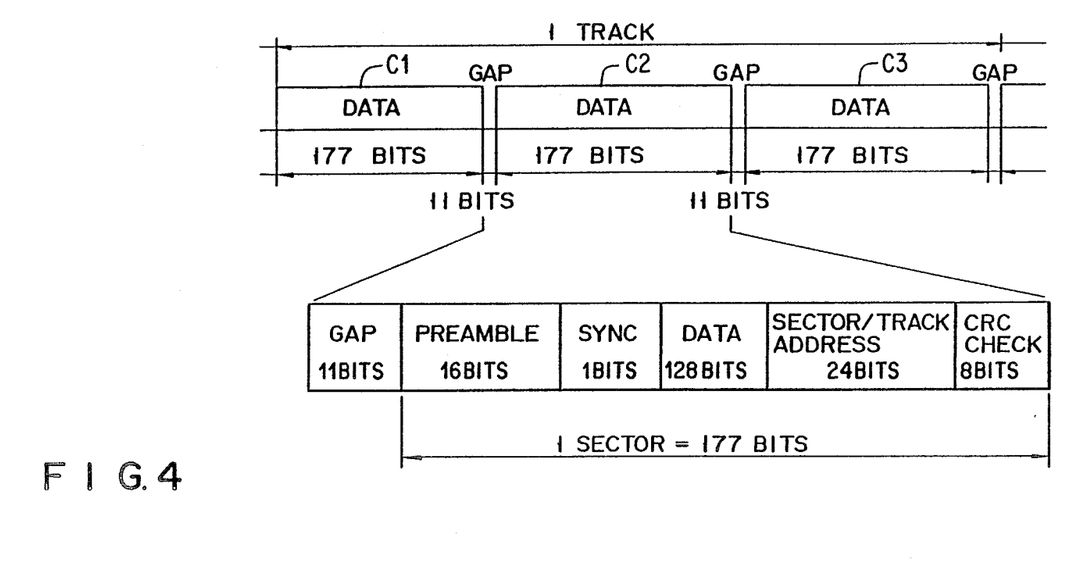
FIG. 4 is a diagram of the data structure of a control track.

As shown in FIG. 4, the control track C consists of three sectors C1, C2 and C3 each including a gap, preamble data, a sync signal, data about the disk characteristic, etc., sector/track address data and CRC (Cyclic Redundancy Check) data. The number of bits comprising the data in each of sectors C1, C2 and C3 is 177 bits in total: 11 for the gap, 16 for the preamble, 1 for the sync signal, 128 for the disk characteristic, 24 for the sector/track address and 8 for the CRC check.

Figure 5:
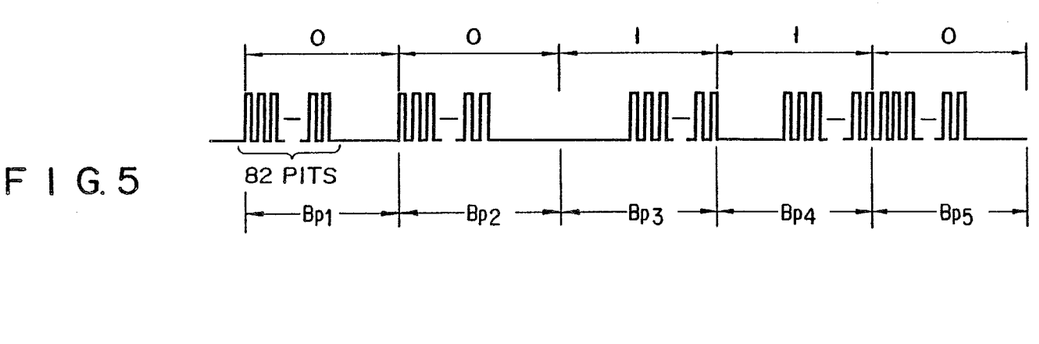
FIG. 5 is a diagram illustrating the pit structure of one bit control track.

As shown in FIG. 5, the presence or absence of 82 consecutive pits along the control track C in the direction of the circumference of optical disk 1 determines whether one bit of each data on control track C represents a "0" or "1", respectively. More specifically, as shown in FIG. 5, if the 82 consecutive pits exist along the first half of control track C such as during bit periods Bp1, Bp2 and Bp5, and if no sequence of 82 pits exists along the second half thereof, the bit respresents a "0". On the other hand, if 82 consecutive pits do not exist along the first half of control track C as shown in bit periods Bp3 and Bp4, and if 82 consecutive pits exist along the second half thereof, the bit represents a "1".

Figure 1:
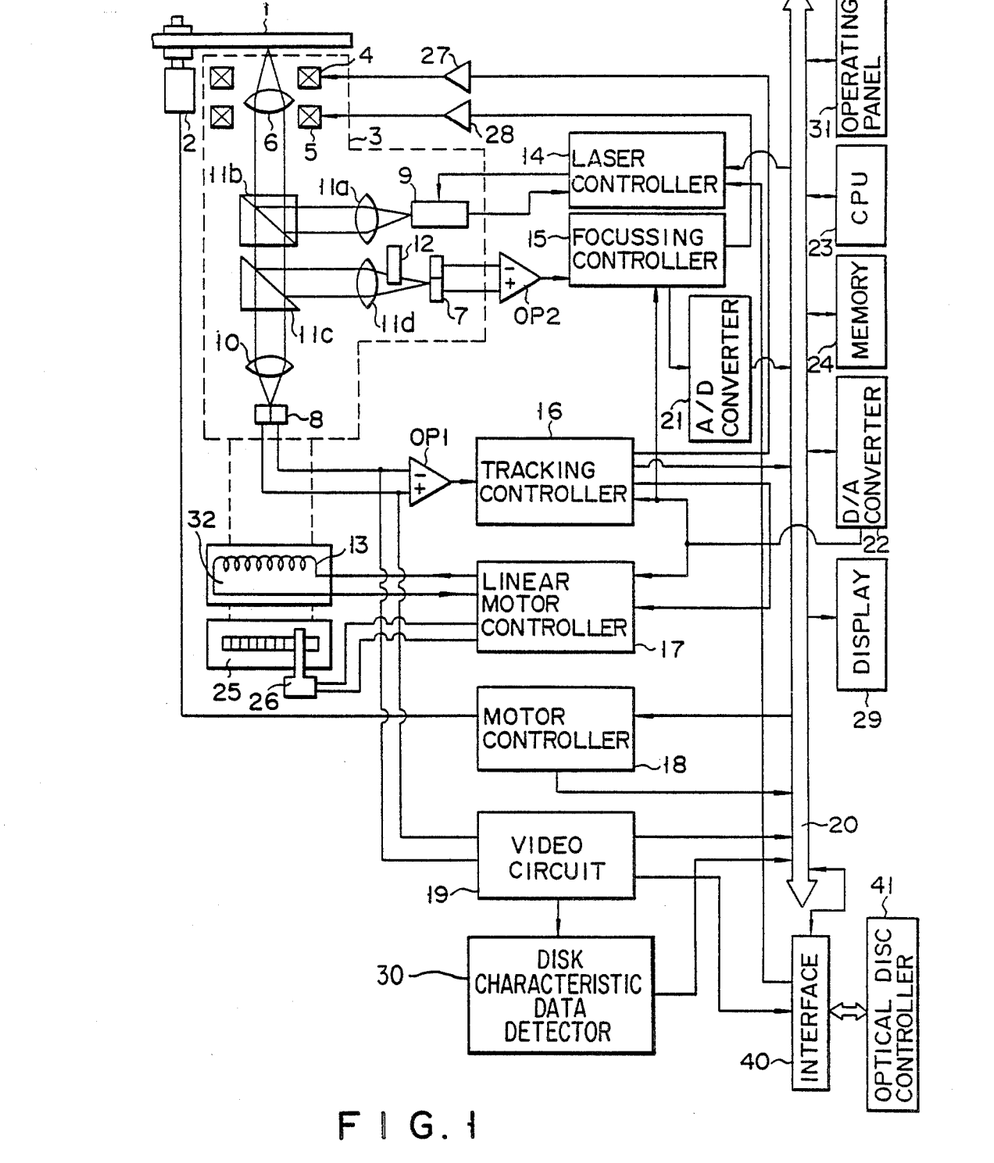
FIG. 1 is a block diagram of an optical data recording/reproducing apparatus comprising a control track access apparatus embodying this invention.

FIG. 1 illustrates an optical data recording/reproducing apparatus comprising the control track access apparatus embodying this invention. Optical disk 1 is rotatable by a DC motor 2 which is controlled by a motor controller 18. Data reproduction from optical disk 1 is carried out through an optical pickup 3. A linear motor 32 is controlled by a linear motor controller 17 coupled to a position detector 26 which detects the position of linear motor 32. An optical scale 25 is coupled to optical pickup 3 in such a way as to be movable together with the pickup 3. Position detector 26 detects moving optical scale 25 and generates a signal associated with the displacement of the scale 25. Linear motor 32 has a fixed section and a movable section; the former includes a permanent magnet (not shown) and the latter includes a drive coil 13. Linear motor 32 is excited by linear motor controller 17 so that optical pickup 3 can move in the radial direction of optical disk 3.

Optical pickup 3 comprises drive coils 4 and 5, objective lens 6, and semiconductor laser 9. Objective lens 6 is supported by a leaf spring (not shown) in optical pickup 3. This objective lens 6, when driven by drive coil 5, is movable in the focusing direction (the optical axis of the lens), and it is movable in the tracking direction (perpendicular to the optical axis of the lens) when driven by drive coil 4. Semiconductor laser 9 is driven by a laser controller 14 located outside optical pickup 3.

Optical pickup further comprises two pairs of photosensors 7 and 8, focusing lens 10, collimator lines 11a, beam splitter 11b, half-prism 11c, focusing lens 11d, and knife edge 12. The laser beam emitted by semiconductor laser 9 is applied to the surface of disk 1 through collimator lens 11a, beam splitter 11b, and objective lens 6. Reflection light from the disk's surface is led through objective lens 6 and beam splitter 11b to half prism 11c which in turn breaks up the reflection light into two components. One of the components is led to photosensors 8 through focusing lens 10, while the other one is led to photosensors 7 through focusing lens 11d and knife edge 12. The two output signals of photosensors 8 are supplied to an operational amplifier OP1 which sends its corresponding output signal, as a track-error signal, to a tracking controller 16. The track-error signal is generated by subtracting one signal of the two signals from the other. This tracking controller 16 sends the track difference signal, as a tracking control signal, to drive coil 4 through an amplifier 27, thereby allowing objective lens 6 to move. The tracking control signal is also supplied to linear motor controller 17.

Photosensors 7 output two electrical signals associated with the focusing position of a laser beam, and these signals are supplied, as a focus-error signal, to a focusing controller 15 through an operational amplifier OP2. The focus-error signal is generated by subtracting one signal of the two signals from the other. This focusing controller 15 applies a voltage whose level corresponds to the received focus-error signal, to focusing drive coil 5 through an amplifier 28. Consequently, the laser beam is focused on a predetermined position on optical disk 1.

Two electrical signals generated at photosensors 8 are supplied as reproduction signals to a video circuit 19. This video circuit 19 reproduces image data and address data, which are displayable on a display 29. Laser controller 14, focusing controller 15, tracking controller 16, linear motor controller 17, motor controller 18 and video circuit 19 are controlled by a CPU 23 which is coupled to them through a bus line 20. This CPU 23 runs a predetermined program stored in a memory 24, for example, in accordance with a command entered through an operating panel 31. An A/D converter 21 is used to permit data transmission between focusing controller 15 and CPU 23. A D/A converter 22 is used to permit data transmission between tracking controller 16 and linear motor controller 17 and CPU 23.

A video signal reproduced by video circuit 19 is sent through an interface circuit 40 to an optical disk controller 41 serving as an external unit.

Figure 6A:
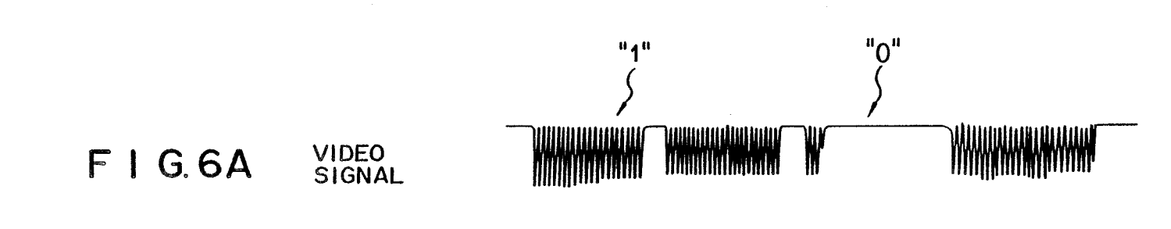
FIGS. 6A-C is a diagram illustrating the process for acquiring an envelope binary signal for use in detecting the presence of disk characteristic data.
Figure 6B:
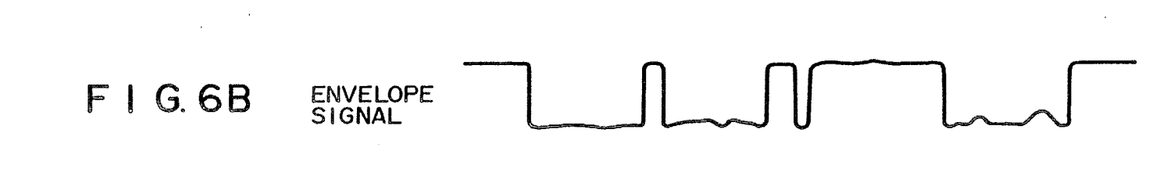

The video signal from video circuit 19, which has a waveform shown in FIG. 6A, is also supplied to a disk characteristic data detector 30, which comprises an envelope detector and an envelope binary circuit (neither shown). The envelope detector detects the envelope of the video signal corresponding to the pits of the disk characteristic data recorded in control track C from video circuit 19 (see FIG. 6B), and determines whether data in the inner most portion of the control track C has been detected or not based on this envelope binary signal while the optical pickup 3 is moved from no data track Dn to control track C. Specifically, when the envelope binary signal of FIG. 6C obtained by binary-coding the envelope signal of FIG. 6B, after the detection of disk characteristic data is at a low level, it is detected that the data is recorded, and when the signal is at a high level, it is detected that no data is recorded. Upon detection of data being recorded, detector 30 outputs a disk characteristic data detection signal to CPU 23.

Figure 3:
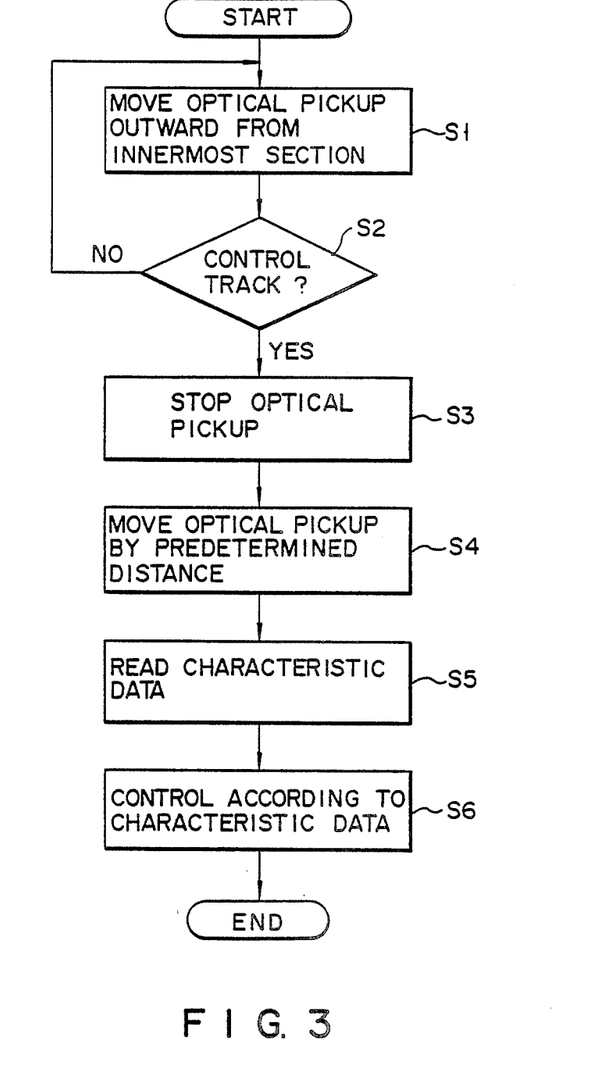
FIG. 3 is a flowchart illustrating the sequence of the access operation to a control track using an optical pickup.

Referring now to the flowchart of FIG. 3, a description will be given of the access operation of optical pickup 3 to control track C provided at the inner circumference of the optical disk 1.

Figure 6C:
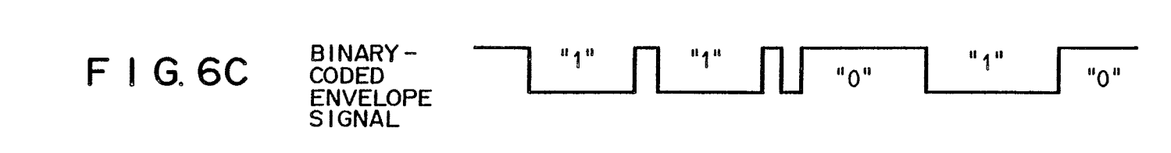
Figure 7:
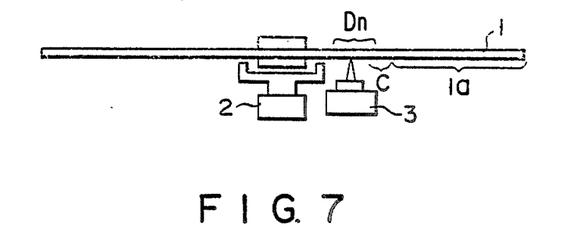
FIG. 7 shows an optical pickup positioned at the innermost section of the optical disk.

As shown in FIGS. 2 and 7 assume that optical pickup 3 is initially positioned at the innermost section (no data track Dn) of optical disk 1 (i.e., inward of the control track C). Suppose that a command to access to control track C is supplied from optical disk controller 41 to CPU 23 through interface circuit 40. Then, CPU 23 controls linear motor controller 17 to move optical pickup 3 from the innermost section (no data track Dn) of optical disk 1 toward control track C (Step 1). The reflection light from the surface of optical disk 1 during the movement of optical pickup 3 is supplied to photosensors 8 and is converted into two electric signals. The converted reproduction electric signals are reproduced and converted into video signals at video circuit 19, and the video signals are supplied to disk characteristic data detector 30. When optical pickup 3 reaches the inner most portion of control track C, that is, when detector 30 detects disk characteristic data being recorded, the detection signal such as that shown in FIG. 6C is sent to CPU 23. Based on the detection signal from detector 30, CPU 23 determines whether or not optical pickup 3 has reached the inner most position of control track C (Step 2). In other words, upon reception of the detection signal, CPU 23 discriminates that optical pickup 3 has reached the inner most portion of track C. In that case, CPU 23 temporarily stops the pickup 3 (Step 3), then moves it by a predetermined distance (Step 4) so that the pickup 3 is positioned at the vicinity of the center of the width X of control track C in the radial direction of the disk 1, and stops pickup 3. Thereafter, CPU 23 executes the reading of the characteristic data recorded on each of sectors C1, C2 and C3 of control track C (Step 5), along the circumference direction of optical disk 1 while determining whether the bit of the read data is "0" or "1" by detecting the time interval between the high level and low level of the envelope binary signal from detector 30. For instance, as shown in FIG. 5, if the low level state of the binary signal continues for a predetermined time and then the high level state continues for a predetermined time, the bit is determined to be "0". On the other hand, if the binary signal maintains its low level state for a predetermined time after being at the high level for a predetermined time, the bit is determined to be "1". In this way, the optical disk 1 can be controlled according to the disk characteristic data (Step 6). In the above manner, the disk characteristic data is read out so that the type and characteristic of optical disk 1 can be known, thus ensuring control suitable for the disk 1. In other words, the proper disk controls can be provided for optical disks of different types and different characteristic by reading out the disk characteristic data recorded on the control track C.

In short, while accessing control track C, optical pickup 3 is moved from the innermost section (no data track Dn) of optical disk 1 toward control track C. Based on the detection signal supplied from detector 30 while moving optical pickup 3, it is determined whether or not the pickup 3 has reached the inner most portion of control track C. If it is determined that optical pickup 3 has reached control track C, the pickup 3 is further moved by a predetermined distance to be in the vicinity of the center of control track C with respect to the radial direction of disk 1. At this time, optical pickup 3 is stopped and reading of the disk characteristic data is started. Thereafter, data reading is executed while determining whether the bit of the characteristic data is "1" or "0" by detecting the duration between the high level and low level of the envelope binary signal supplied from detector 30.

Therefore, as access to control track C is correctly permitted, the disk characteristic data recorded on control track C can be reliably read out so as to provide the proper control for different optical disks according to their specifications recorded on the control track C.

Figure 8:
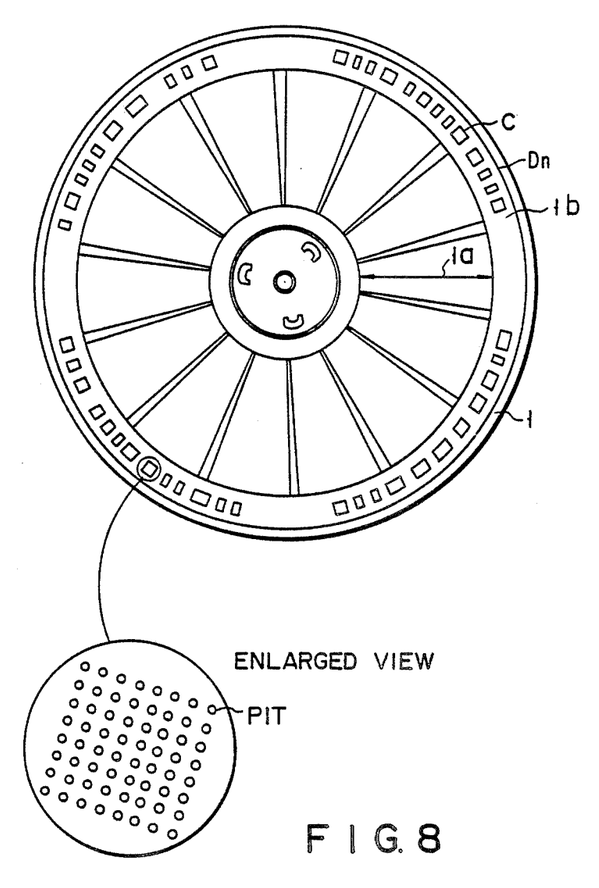
FIG. 8 is a diagram illustrating the structure of the optical disk having a control track provided at its outer circumference.

Although the above description has been given with reference to the access operation of optical pickup 3 to control track C provided at the inner circumference of optical disk 1, starting from the innermost section (no data track Dn) of an optical disk 1, this invention is not limited to this particular case. The access operation may start from the outermost section of the optical disk or from any point on the disk. Also, as shown in FIG. 8, control track C can be provided next to no data track Dn provided at the outermost portion of optical disk 1.

What is claimed is:

1. An apparatus for accessing a control track of an optical disk, said control track having characteristic data relating to physical and operative characteristics of said optical disk, comprising:
    optical pickup means for directing a light beam onto said optical disk so that a portion of said light beam is reflected from said optical disk, and for receiving said reflected light beam;
    means for moving said optical pickup along a radius of said optical disk;
    means for detecting an edge of said control track in accordance with said reflected light beam; and
    means for displacing said optical pickup along said radius of said optical disk from said edge of said control track to a center portion of said control track upon detection of said edge of said control track by said edge detecting means.

2. The apparatus according to claim 1, wherein said characteristic data includes data relating to at least a type and format of said optical disk.

3. The apparatus according to claim 1, wherein said control track includes a plurality of pits formed in said optical disk in accordance with International Standardization Organization (ISO) regulations.

4. The apparatus according to claim 1, wherein said optical pickup means includes photosensor means for generating an electrical signal corresponding to said reflected light beam, and wherein said edge detecting means includes means for detecting the presence of said characteristic data in accordance with said electrical signal generated by said photosensor.

5. The apparatus according to claim 1, wherein said control track includes first and second sectors formed along a circumference of said control track, said first and second sectors having substantially identical characteristic data.

6. An apparatus for accessing a control track of an optical disk, said optical disk having a first area formed at an innermost portion of said optical disk, a second area concentrically formed at a second innermost portion of said optical disk around said first area, and a third area concentrically formed at a third innermost portion of said optical disk around said second area, and said control track being formed in said second area and having characteristic data relating to physical and operative characteristics of said optical disk, comprising:
  optical pickup means for directing a light beam onto said optical disk so that a portion of said light beam is reflected from said optical disk, and for receiving said reflected light beam;
  means for positioning said optical pickup at one of said first and third areas;
  means for moving said optical pickup along a radius of said optical disk and across said first area, said second area, and said third area; p1 means for detecting an edge of said second area in accordance with said reflected light; and
  means for displacing said optical pickup along said radius of said optical disk from said edge of said second area to a center portion of said control track upon detection of said edge of said second area by said edge detecting means.

7. The apparatus according to claim 6, wherein said optical pickup positioning means includes means for positioning said optical pickup at first area, said optical pickup moving means includes means for moving said optical pickup along a radius of said optical disk and across said first area, said second area, and said third area in that order, said edge detecting means includes means for detecting an inner edge of said second area, and said optical pickup is placing means includes means for displacing said optical pickup along said optical disk radius from said inner edge of said second area to said center portion of said control track upon detection of said inner edge of said second area by said inner edge detecting means.

8. The apparatus according to claim 6, wherein said optical pickup positioning means includes means for positioning said optical pickup at said third area, said optical pickup moving means includes means for moving said optical pickup along a radius of said optical disk and across said third area, said second area, and said first area in that order, said edge detecting means includes means for detecting an outer edge of said second area, and said optical pickup displacing means includes means for displacing said optical pickup along said optical disk radius from said outer edge of said second area to said center portion of said control track upon detection of said outer edge of said second area by said inner edge detecting means.

9. The optical apparatus according to claim 6, wherein said characteristic data includes data relating to at least a type and format of said optical disk.

10. The optical apparatus according to claim 6, wherein said control data includes a plurality of pits formed in said optical disk in accordance with International Standardization Organization (ISO) regulations.

11. The optical apparatus according to claim 6, wherein said optical pickup means includes photosensor means for generating an electrical signal corresponding to said reflected light beam, and wherein said edge detecting means includes means for detecting the presence of said characteristic data in accordance with said electrical signal generated by said photosensor.

12. A method for accessing a control track of an optical disk, said control track having characteristic data relating to physical and operative characteristics of said optical disk, comprising the steps of:
  directing a light beam onto said optical disk so that a portion of said light beam is reflected from said optical disk;
  receiving said reflected light beam;
  moving said optical pickup along a radius of said optical disk;
  detecting an edge of said control track in accordance with said reflected light beam; and
  displacing said optical pickup along said radius of said optical disk from said edge of said control track to a center portion of said control track upon detecting said edge of said control track.

13. A method for accessing a control track of an optical disk, said optical disk having a first area formed at an innermost portion of said optical disk, a second area concentrically formed at a second innermost portion of said optical disk around said first area, and a third area concentrically formed at a third innermost portion of said optical disk around said second area, and said control track being formed in said second area and having characteristic data relating to physical and operative characteristics of said optical disk, comprising the steps of:
  directing a light beam onto said optical disk so that a portion of said light beam is reflected from said optical disk;
  receiving said reflected light beam;
  positioning said optical pickup at one of said first and third areas;
  moving said optical pickup along a radius of said optical disk and across said first area, said second area, and said third area;
  detecting an edge of said second area in accordance with said reflected light; and
  displacing said optical pickup along said radius of said optical disk from said edge of said second area to a center portion of said control track upon detecting said edge of said second area.

14. The method according to claim 13, wherein the step of positioning said optical pickup includes the step of positioning said optical pickup at said first area, said step of moving said optical pickup includes the step of moving said optical pickup along said radius of said optical disk and across said first area, said second area, and said third area in that order, the step of detecting an edge of said second area includes the step of detecting an inner edge of said second area, and wherein the step of displacing said optical pickup includes the step of displacing said optical pickup along said radius of said optical disk from said inner edge of said second area to said center portion of said control track.

15. The method according to claim 13, wherein the step of positioning said optical pickup includes the step of positioning said optical pickup at said third area, said step of moving said optical pickup includes the step of moving said optical pickup long said radius of said optical disk and across said third area, said second area, and said first area in that order, the step of detecting an edge of said second area includes the step of detecting an outer edge of said second area, and wherein the step of displacing said optical pickup includes the step of displacing said optical pickup along said radius of said optical disk from said outer edge of said second area to said center portion of said control track.

16. The method according to claim 13, wherein said control data includes data relating to at least a type and format of said optical disk.

17. The method according to claim 13, wherein said control data includes a plurality of pits formed in said optical disk in accordance with International Standardization Organization (ISO) regulations.

18. The method according to claim 13, wherein said step of receiving said reflected light beam includes the step of generating an electrical signal corresponding to said received reflected light beam, and wherein the step of detecting said edge of said second area includes the step of detecting the presence of said characteristic data in accordance with said electrical signal.

19. The method according to claim 13, wherein said control track includes first and second sectors formed along a circumference of said control track, said first and second sectors including substantially identical characteristic data.

* * * * *

UNITED STATES PATENT AND TRADEMARK OFFICE
CERTIFICATE OF CORRECTION

PATENT NO. : 4,972,399

DATED : November 20, 1990

INVENTOR(S) : Toshiyuki Miyasaka

It is certified that error appears in the above-identified patent and that said Letters Patent is hereby corrected as shown below:

Col. 5, line 18, after "7" insert --,--
line 39, change "inner most position" to --innermost portion--.
line 42, change "inner most" to --innermost--.
line 68, change "characteristic" to --characteristics--.

Col. 6, line 8, change "inner most" to --innermost--.

Col. 7, line 22, delete [pl] and start new line at "means".
line 32, after "at" insert --said--.
line 38, change "is pacing" to --displacing--.

Col. 8, line 63, change "long" to --along--.

Signed and Sealed this

Sixth Day of April, 1993

Attest:

STEPHEN G. KUNIN

Attesting Officer

Acting Commissioner of Patents and Trademarks